United States Patent [19]

Coughlin

[11] 3,710,548
[45] Jan. 16, 1973

[54] PROCESS AND DEVICE FOR PURIFYING AIR

[76] Inventor: Robert W. Coughlin, 902 Seventh Avenue, Bethlehem, Pa. 18018

[22] Filed: Oct. 19, 1970

[21] Appl. No.: 81,877

[52] U.S. Cl. ..........................55/73, 55/74, 55/77, 55/91, 55/234, 55/243, 23/4, 23/162, 23/168, 23/175, 23/288
[51] Int. Cl. ..............................................B01d 53/06
[58] Field of Search........55/73, 74, 77, 91, 232, 234, 55/243; 23/4, 162, 168, 175, 288

[56] References Cited

UNITED STATES PATENTS

| | | | |
|---|---|---|---|
| 3,598,521 | 8/1971 | Allen | 55/73 X |
| 2,886,131 | 5/1959 | Conlisk et al. | 55/74 X |
| 3,328,941 | 7/1967 | Green | 55/243 X |
| 3,405,508 | 10/1968 | Peters et al. | 55/73 |
| 3,291,582 | 12/1966 | Tyson | 55/74 X |
| 3,416,293 | 12/1968 | Alexander | 55/73 |

*Primary Examiner*—John Adee

[57] ABSTRACT

A process and device in which air or another gas mixture is contacted with a liquid whereby particulate impurities are washed from the gas and whereby sulfur dioxide and other gaseous pollutants, together with oxygen, are absorbed from the gas into the liquid whereupon said sulfur dioxide and other gaseous pollutants are oxidized to other more soluble chemical forms with the assistance of a catalyst present within the system.

10 Claims, 2 Drawing Figures

PATENTED JAN 16 1973 3,710,548
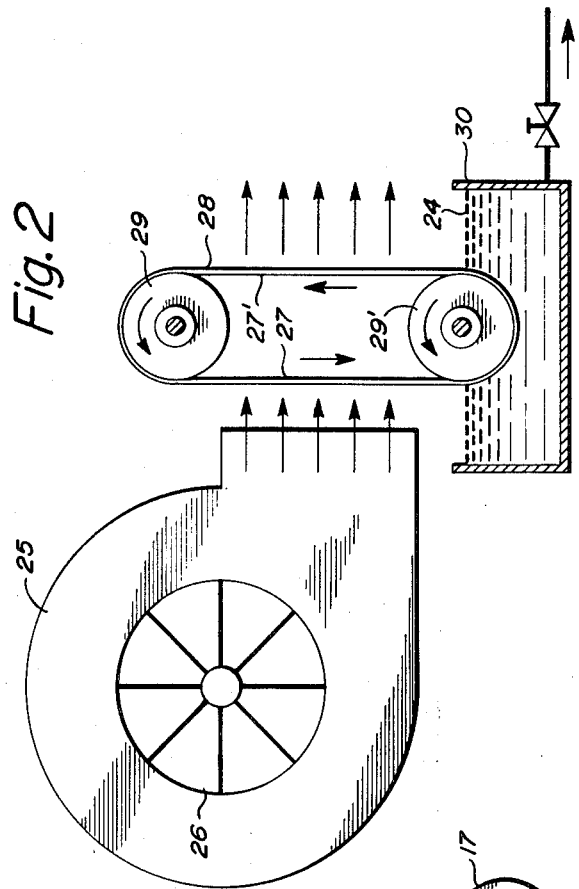
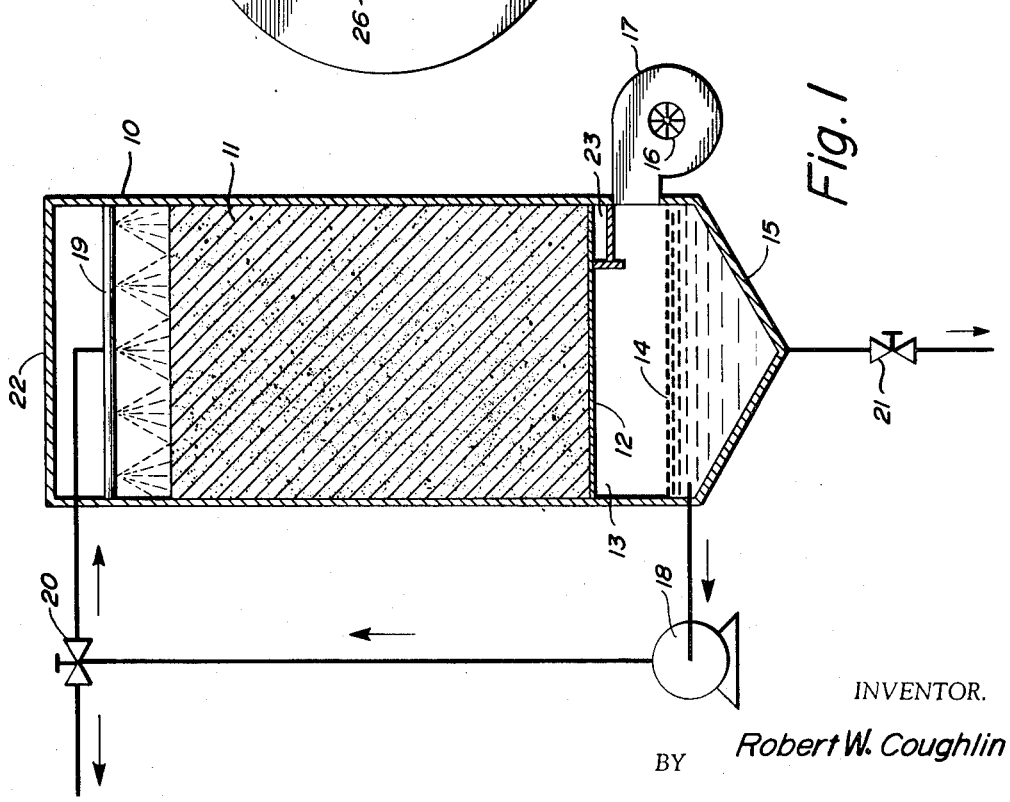
INVENTOR.
Robert W. Coughlin
BY

PROCESS AND DEVICE FOR PURIFYING AIR

BACKGROUND OF THE INVENTION

1. Field of Invention

This invention relates to a process and to a device for purifying air or other gas mixtures from pollutants by contacting with a liquid which washes particulate impurities from the gas and which also absorbs from said gas sulfur dioxide and other gaseous pollutants as well as oxygen, whereupon said sulfur dioxide and other gaseous impurities are oxidized to other, more soluble chemical forms with the assistance of a catalyst present in the system.

2. Description Of Prior Art

Processes and devices for purifying air for breathing in homes, offices, institutions, etc. have relied primarily on filtration and electrostatic techniques for removing dusts and particulates. In recent times the importance of removing gaseous pollutants has also become apparent and, at present, activated carbon is used to some extent to remove gaseous pollutants from air. However, in such cases, when the activated carbon becomes saturated with pollutants it must be replaced or regenerated. Moreover, the many different industrial-type processes for removing $SO_2$ from gases also require a regeneration of the sorbent or other complex operations or steps that do not make for simple, convenient devices or processes well adapted for use in homes, offices, institutions, hotels, etc.

Until the present invention, no simple process and device has been available for removing from ambient air both gaseous and particulate-matter pollutants and simultaneously concentrating said pollutants into a small volume of liquid that can be easily discarded after the pollutants have reached a suitable concentration level therein. The present invention makes use of both a liquid and a catalyst to accomplish this but the present invention differs from prior art in that gaseous pollutants are absorbed into the liquid before they are oxidized, and in that the oxidation catalyst may be either homogeneous, (i.e., dissolved in the liquid) or heterogeneous (i.e., a solid), and in that, when the catalyst is activated carbon, it is not necessary to impregnate the active carbon with another catalytically active substance. These aspects distinguish the present invention from such prior art as is contained in U.S. Pat. Nos. 3,345,125; 3,318,662; 3,473,297; 3,150,923; 3,405,508 and 3,486,852.

SUMMARY OF THE INVENTION

It is an object of this invention to provide a means of removing from air, or from another gaseous mixture, the pollutant sulfur dioxide and other gaseous pollutants as well as particulate-matter, pollutant impurities.

It is another object of this invention to provide a process whereby gaseous and particulate pollutants are removed from air or from another gas mixture by concentrating said pollutants or their reaction products in a liquid.

It is a further object of this invention to provide a process which removes gaseous pollutants from air or from another gaseous mixture by absorbing said pollutants, together with oxygen, into a liquid whereupon said pollutants are oxidized to forms more soluble in the liquid through the assistance of a catalyst present within the system.

Still another object of this invention is to provide a means of treating air to remove pollutants present in said air, whereby said pollutants or their reaction products become concentrated in a liquid such as water or an aqueous solution.

Yet another object of this invention is to provide a device adapted for home, office or institutional use that will purify air by removing pollutants and concentrating them or their reaction products in a liquid such as water or in an aqueous solution that can be periodically discarded and replenished.

A further object is to provide a device of the above type in which the liquid can be recycled for contacting the air, because the absorbed gaseous pollutants are converted to different chemical forms which do not interfere, or do not strongly interfere, with the ability of the liquid to absorb additional pollutants from the air.

These and other objects have now herein been attained by a process in which air containing sulfur dioxide and particulate-matter pollutants is counter-currently contacted with water whereby the particulate impurities enter the water and the sulfur dioxide together with oxygen is absorbed by the water, whereupon the sulfur dioxide is oxidized by the oxygen with the assistance of a homogeneous catalyst dissolved in the water or of a heterogeneous catalyst with which the water also comes into contact.

DESCRIPTION OF THE DRAWINGS

Other objects and advantages of the invention will appear during the course of the following descriptions in connection with the accompanying drawings which exemplify forms the invention may assume.

FIG. 1 is a schematic diagram of a device for carrying out the process of this invention by using a packed gas-absorption column in which liquid flows downward over the surface of the packing and gas flows upwards through the interstices between pieces of packing.

FIG. 2 is a schematic diagram of a device for carrying out the process of this invention by using a moving-belt of porous material to bring liquid into contact with the gas stream.

DESCRIPTION OF PREFERRED EMBODIMENTS

The embodiments discussed here are presented herein for purposes of illustration only and are not intended to be limiting in any manner.

Referring to FIG. 1, the number 10 designates a cylindrical column packed with solid packing material 11, over which liquid flows in a downward direction under the influence of gravity. The packing 11 is supported by screen 12 below which is a vapor space 13 through which the liquid leaving the packing falls into the liquid supply 14 contained in the cylindrical-reservoir 15 portion of the column. Gas enters the inlet 16 of the blower 17 whereby it is propelled into the vapor space 13. The baffle 23 is provided to prevent liquid from entering blower 17. Liquid is pumped by pump 18 from the reservoir 15 through three-way valve 20 to the top of the column where it passes through the distributor 19 to the top of the packing. The three-way valve 20 is provided to allow pumping most of the liquid out of the device when necessary; liquid remaining in the lower portion of the reservoir 15, including any accumulated solid debris or particulate-matter impurities, can be drained from the bottom of the device through valve 21. The catalyst for this process may be a homogeneous catalyst dissolved in the liquid; or it may be a heterogeneous catalyst mixed with the packing, or located in the lower portion of the packed secton above packing support 12, or situated within the reservoir 15 in contact with the liquid 14. Alternatively, the entire packed section 10 of the column may be filled with a solid heterogeneous catalyst which then also serves as a packing 11 to promote gas absorption and removal of impurities from the gas into the water.

The operation of the device of FIG. 1 is as follows: Liquid is pumped from the reservoir 15 by pump 18 through valve 20 to the distributor 19 which introduces said liquid to the top of the packing 11. Liquid flows downward by gravity over packing 11 and simultaneously contacts gas flowing upward through packing 11. Gas to be purified enters the intake 16 of blower 17 whereby it is propelled into space 13 and then upwards through packing support 12 and packing 11; the gas finally leaves the column through the top of the column 22. As the liquid contacts the gas in packed section 11, particulate-matter impurities are washed from the gas into the liquid and gaseous impurities and oxygen are absorbed from the gas into the liquid, whereby the gas which leaves the top 22 of the column is depleted in impurities and thus purified. Impurities, such as sulfur dioxide thus absorbed into the liquid are oxidized to more soluble, non-volatile products, such as sulfuric acid, by reacting with the oxygen also absorbed in the liquid and with the assistance of a catalyst present in the system. Such catalyst may be a homogeneous catalyst dissolved in the liquid or it may be present in the form of a solid material (heterogeneous catalyst) within the packed section of column 10 or within the reservoir 15. Particulate-matter impurities are carried by the liquid into the reservoir 15 where they settle to the bottom. The liquid is recycled from the reservoir 15 to the distributor 19 by the pump 18. Upon continuous recycle, the liquid continues able to absorb gaseous impurities because said gaseous impurities are oxidized, after absorption, to other chemical forms (by the oxygen also absorbed in the liquid) with the assistance of the catalyst present in the system. These chemical-reaction products of higher oxidation state do not interfere markedly with continued absorption and, in this way, the liquid is prevented from attaining equilibrium with gaseous impurities in the gas to be purified.

The device shown in FIG. 1 can be filled with liquid by merely pouring through the top 22 of the device. After operation, most of the liquid (now containing impurities) can be pumped from the device through valve 20 (set in the suitable position); the remainder of the liquid (with impurities) can be drained by gravity from the device through valve 21. It is clear that if a homogeneous catalyst, rather than a heterogeneous catalyst, is used it can be added with fresh liquid when the system is filled.

Referring to the device depicted in FIG. 2, the gas enters the system through inlet 26 of the blower 25 whereby it is propelled through sections 27 and 27' of the flexible, porous moving belt 28. The flexible, porous moving belt 28 is wet with liquid which it has picked up from liquid supply 24 in reservoir 30. After contacting the porous wetted belt 28, the gas passes from the system. The porous wetted belt 28 is stretched over drums 29 and 29' which are driven by a motor not shown and which thereby cause the belt to move. The porous, moving belt saturated with liquid from the reservoir 30 brings this liquid into contact with gases leaving the system, whereby particulate impurities are removed by filtering action and gaseous impurities and oxygen are absorbed by the liquid transported by the belt 27'. After passing over the upper drum 29, the belt 27 encounters gas leaving the blower 25 and, again in this region, the belt also filters particulate-matter impurities from the gas and also absorbs oxygen and gaseous impurities therefrom. Finally, the belt enters the reservoir where it deposits particulate impurities. Gaseous impurities absorbed into the liquid are oxidized, as in the case of the device of FIG. 1, by oxygen also absorbed in the liquid and with the assistance of a catalyst present within the system. Said catalyst may be a homogeneous catalyst dissolved in the liquid or it may be a solid heterogeneous catalyst contained within the porous, flexible moving belt or within the reservoir 30.

In case the gas to be purified contains a large concentration of particulate-matter impurities it is clear that it may be desirable to place a separate filter for particulates at the gas inlet of either the device of FIG. 1 or that of FIG. 2, in order to avoid possible plugging of the packing in the first case or of the porous belt in the second case.

EXAMPLE I

Air containing 1 ppm of sulfur dioxide is passed at the rate of about 2,250 ft$^3$/hr through a cylindrical column, about one foot in diameter and about two feet high, packed with ½-inch Raschig Rings. Pure water flows downward over the packing in this column at a flow rate of about one gallon/minute. The air and water are essentially at room temperature. Using standard correlations for mass transfer, one computes that about 94 percent of the sulfur dioxide is absorbed from the air by the water (about 71 percent is absorbed if the column is assumed to be about 1 foot high). Thus, this a simple method for purifying the air in a room since 2,250 ft$^3$ is about the volume of a small room. However, the water leaving the column does not retain its original ability to absorb sulfur dioxide from the air since, after passing once through the column, it exits with a sulfur-dioxide concentration of about 0.2 ppm; if a fixed volume of water is continuously recycled through the column, as in FIG. 1, the amount of sulfur dioxide removed from the air will decrease continuously as the water approaches a concentration equilibrium with the air. However, as the water absorbs sulfur dioxide from the air it also absorbs oxygen and it can be computed that the rate of absorption into pure water of oxygen from air is faster than that of sulfur dioxide from air in which the SO$_2$ concentration is 1 ppm. Therefore, there will be more than sufficient oxygen absorbed into the water along with the SO$_2$ to oxidize the sulfur dioxide to sulfuric acid; however, a catalyst will usually be needed to insure that the rate of oxidation of sulfur dioxide is fast enough to keep up with the rate of absorption of that gas so that the sulfur-dioxide concentration will not build up in the water due to the conversion of said SO$_2$ to sulfuric acid; said sulfuric acid, even in concentrations up to several percent, will not materially interfere with the further absorption of sulfur dioxide from the air by the water when the water is recycled.

Based on studies of the oxidation of sulfite ion carried out by Fuller [*Journal of the American Chemical Society* 63, p. 1644 (1941)] and Yagi [*Chemical Engineering Science* 17, p. 411 (1962)] cupric ion and cobaltic ion dissolved in water are good homogeneous catalysts for the oxidation of $SO_2$ in water containing dissolved oxygen. Using the results of Yagi and those of Fuller, and assuming the system contains about one gallon of water, one computes that about 0.01 gm mole per liter of $CoSO_4$ or of $CuSO_4$ should be a sufficient concentration of homogeneous catalyst to insure that the water recycled to the top of the column in this example contains little of the originally absorbed $SO_2$ in a form that will interfere with the absorption of additional $SO_2$ from the air, a large proportion of the absorbed $SO_2$ having been homogeneously oxidized to $SO_3$ and sulfuric acid by the dissolved oxygen with the assistance of the homogeneous catalyst. Based on the claims of Pauling (U.S. Pat. No. 3,318,662) suitable homogeneous catalysts for the present example could be soluble salts of Mn,Cu,Ti,Fe,Zn,Ni,Co,Cr,V,Mo and Sn. Some suitable packing materials for the absorption column of this example would include ceramic rings, saddles or spirals, various shapes of plastic tower packings or standard metallic tower packings, preferably of a corrosion resistant metal like a stainless steel.

EXAMPLE II

This example makes use of the same system as Example I except a heterogeneous catalyst, such as activated carbon or oxides of Mn,Cu,Ti,Fe,Zn,Ni,Co,Cr,V,Mo, or Sn, is included in the system instead of, or together with, the homogeneous catalyst of Example I. Said heterogeneous catalyst may be placed in contact with the liquid in the reservoir below the packing; or it may be in the form of fine particles carried by the water in slurry form; or it may be mixed with the packing; or it may actually serve as the packing for the gas absorption column.

Ovchinnikova and Davtyan [*Zhur. Fiz. Khim.* 30, 1735 (1956)] studied the use of activated carbon as a heterogeneous catalyst for the oxidation of $SO_2$ to sulfuric acid in a system containing water and oxygen; based on their results, one estimates that about 22 lb of granular activated carbon [bulk density 22 $lb/ft^3$—10 $\times$40 mesh particle size] should possess sufficient catalytic activity to produce the reaction rate of sulfur dioxide oxidation required in Example I. This amount of granular carbon would about fill a cylindrical column about 1 ft in diameter and about 1 foot high. Said activated carbon catalyst could conveniently be mixed with an inert packing material to fill the gas absorption part of the device of FIG. 1; or the entire packing could be of activated carbon of suitable particle size which would supply more than adequate catalytic activity; or the activated carbon could be suspended as fine particles in the water to form a slurry therewith; or the carbon could be located within the reservoir in contact with the water therein.

In each of the examples above the water can be recycled continuously until the concentration of sulfuric acid builds up to the point where it begins to severly interfere with the absorption and oxidation of $SO_2$. For example, if the $H_2SO_4$ is allowed to build up in the water in the devices of Example I or Example II until a concentration of 10 percent is achieved, this represents about 20 days of operation; clearly, it would not be inconvenient to change the water every 20 days or even more frequently. Moreover, if the air to be treated is very dry evaporation of water may take place, in which case it would be necessary to add make-up water to the system as needed. Finally it should be pointed out that although the discussion here has been concerned largely with the absorption and oxidation of the gaseous pollutant sulfur dioxide U.S. Pat. No. 2,992,895 suggest that the lower oxides of nitrogen will be absorbed and oxidized in a similar fashion, at least when an active-carbon heterogeneous catalyst is used in the system.

From the foregoing descriptions of preferred forms of the invention, it is evident that it provides a simple and effective means of purifying air, removing not only particulate-matter pollutants but important gaseous pollutants as well. Said pollutants become concentrated within a relatively small volume of liquid which can conveniently be discarded from time to time.

Having fully described the invention, it will be apparent to one having ordinary skill in the art that it is not limited to the precise configurations illustrated and that many modifications and changes can be made without departing from the spirit and scope thereof.

What is claimed and intended to be covered by Letters Patent is:

1. A process of removing from a gas stream, which contains an excess of oxygen, an oxide of a multivalent non-metal selected from the group which consists of sulfur and nitrogen, comprising,
   a. contacting said gas with an aqueous liquid in the presence of a catalyst for the chemical reaction of said oxide to a more soluble form;
   b. recirculating said aqueous liquid into contact with said gas stream;
   c. recovering or accumulating in a body of said aqueous liquid a product which contains an aqueous solution of said more soluble form of the oxide of aforesaid multivalent non-metals.

2. The process of claim 1 wherein the gas is air and the temperature of operation is about room temperature.

3. The process of claim 2 wherein particulate matter is also filtered from the gas.

4. The process of claim 2 wherein the catalyst is selected from the group which consists of compounds of Cu, Co, Mn, Fe, Ni, Cr, and V.

5. The process of claim 4 wherein particulate matter is also filtered from the gas and wherein the concentration of said catalyst exceeds about 30 parts by weight per one million parts by weight of said water.

6. The process of claim 3 wherein the catalyst is a carbonaceous material.

7. An apparatus for removing an oxide of sulfur or nitrogen from air, wherein oxygen and said oxide are absorbed into an aqueous liquid, wherein said oxide is oxidized to more soluble form with the assistance of a catalyst, comprising means forming a reservoir, a body of liquid in said reservoir, catalyst means in contact with said liquid, first and second drum means, said first drum means being positioned at least partly below the surface of said body of water and said second drum means positioned above said body, a flexible, porous movable filter belt positioned on said drum means, blower means positioned to force said air through said filter belt and means to move said belt, after contacting said gas, into and out of said reservoir whereby particulate impurities are removed by filtering action and gaseous impurities and oxygen are absorbed by the liquid transported by said belt.

8. The apparatus of claim 7 wherein said catalyst means is contained within said filter belt.

9. The apparatus of claim 7 wherein said catalyst means is contained within said body of liquid.

10. The apparatus of claim 7 wherein said catalyst means is a carbonaceous material.

* * * * *